United States Patent [19]

Sutphin et al.

[11] Patent Number: 4,710,694
[45] Date of Patent: Dec. 1, 1987

[54] MICROPROCESSOR CONTROLLED BATTERY CHARGER

[75] Inventors: Richard C. Sutphin, Cuba, N.Y.; Steven R. Bell, Shinglehouse, Pa.; Kurt Monsell, Portville, N.Y.

[73] Assignee: Acme Electric Corporation, Olean, N.Y.

[21] Appl. No.: 869,684

[22] Filed: Jun. 2, 1986

[51] Int. Cl.⁴ ............................................. H02J 7/00
[52] U.S. Cl. .................................... 320/21; 320/24; 320/32; 320/39
[58] Field of Search ...................... 320/20, 21, 23, 24, 320/32, 39, 40, 44

[56] References Cited

U.S. PATENT DOCUMENTS

| | | | |
|---|---|---|---|
| 3,864,617 | 2/1975 | Smith et al. | 320/39 |
| 3,876,921 | 4/1975 | Bigbee, III | 320/20 |
| 3,887,858 | 6/1975 | Burkett et al. | 320/39 |
| 3,911,349 | 10/1975 | Seeley et al. | 320/20 |
| 3,938,019 | 2/1976 | Schmitt et al. | 320/21 |
| 4,146,830 | 3/1979 | Foster | 320/23 |
| 4,163,933 | 8/1979 | Foster | 320/20 |
| 4,191,918 | 3/1980 | Nicholls | 320/23 |
| 4,217,533 | 8/1980 | Beek | 320/23 |
| 4,242,627 | 12/1980 | Kisiel | 320/21 |
| 4,246,529 | 1/1981 | Jurgens et al. | 320/39 |
| 4,289,836 | 9/1981 | Lemelson | 429/61 |
| 4,388,582 | 6/1983 | Saar et al. | 320/20 |
| 4,396,880 | 8/1983 | Windebank | 320/21 |
| 4,476,425 | 10/1984 | Chernotsky et al. | 320/39 |
| 4,549,127 | 10/1985 | Taylor et al. | 320/21 |

Primary Examiner—Peter S. Wong
Assistant Examiner—Anita M. Ault
Attorney, Agent, or Firm—Pearne, Gordon, McCoy & Granger

[57] ABSTRACT

A microprocessor controlled battery charger utilizes a high frequency switching circuit and a means to read the voltage of the battery plus a timer in the circuit wherein the microprocessor is connected both to the timer and to the voltage reading means and establishes a decreasing step charging rate of the battery so as to charge the battery at a first charging rate, then at a second lower charging rate until the rate of change of voltage with time is less than a small amount of volts per hour and then the current is reduced to a third charging rate for a finishing charge of the battery. In the preferred embodiment the first charging rate is maintained until a predetermined battery voltage is achieved and the third charging rate is maintained for a given period of time.

15 Claims, 7 Drawing Figures

MICROPROCESSOR CONTROLLED BATTERY CHARGER

BACKGROUND OF THE INVENTION

The prior U.S. Pat. Nos. 4,146,830 and 4,163,933 were examples of patents disclosing battery chargers utilizing a step-wise adjustment of the charging current, for example, in response to battery voltage. U.S. Pat. No. 4,217,533 utilized a trickle current after the battery was charged. U.S. Pat. No. 4,246,529 disclosed a battery charger with a constant charging current during each cycle of the 50 hertz voltage wave. U.S. Pat. No. 3,887,858 utilized a high rate constant current for initial battery charging and then utilized a timed overcharged interval. U.S. Pat. No. 3,911,349 disclosed a battery charger wherein the charging current decreases as the time rate of change of the battery voltage decreases. U.S. Pat. No. 3,938,019 disclosed a battery charger with a large constant current and then constant current pulses. U.S. Pat. No. 3,688,117 disclosed a battery charger with a high charging rate and then a medium charging rate to two different voltages per cell.

Problems with the prior art apparatus include the fact that batteries manufactured by different manufacturers behave differently on charge and have different discharge characteristics. Also the temperature and age of the battery and prior service conditions affect the rate at which a battery may effectively be charged. Batteries of small and large capacity also behave differently under a given rate of charging current. If the battery is old rather than new, it would need to be charged for a longer period of time at the same ampere rate than a new battery of the same ampere hour capacity. Further under a given charge rate, a battery may not be fully charged if charged only for a certain length of time.

SUMMARY OF THE INVENTION

Accordingly, the problem to be solved is how to construct a battery charger so that batteries of many different ampere hour capacities, different ages and service lives, and different states of charge can be effectively charged to a fully charged state without overcharging and without any substantial gassing. This problem is solved by a microprocessor controlled battery charger adapted to be connected to a battery to be charged, said battery charger comprising, in combination, means to connect the battery charger to the battery to be charged, means to read the voltage of the battery, a timer, and a microprocessor connected to said timer and to said voltage reading means for establishing a first charging rate for at least a short time period and for establishing a second charging rate until the rate of change of voltage with time is less than x/100 volts per hour at which time the current is reduced to a third charging rate for a finishing charge of the battery, where x is a positive number.

The present invention is a microprocessor directed battery charger which utilizes dv/dt sensing and a timed finishing charge wherein the battery charger is powered by an FET switcher under current mode control, which enables quicker and more efficient battery charging.

In the charging of an automobile battery, an important consideration is the ability to quickly and nearly completely charge the battery without causing any damage to it. The present invention provides a charger which safely and efficiently charges a battery much more quickly than a conventional 60 hertz transformer based charger. In this invention a microprocessor directs the charging and senses when the battery has accepted all of the charge which it is reasonably capable of accepting. A lower rate finishing charge for a timed period then helps to bring the specific gravity of the battery up to its final value. By using a FET switcher under current mode control the weight of the battery charger is decreased and the speed and efficiency in watts is increased.

The FET switcher utilizes a forward converter under microprocessor control and a liquid crystal display which provides the user with a wide variety of output information. This results in a safe, highly efficient and totally automatic battery charger.

The user of the charger may be a typical homeowner and input from the user is via a touch membrane key pad with the input decoded by a microprocessor, which in turn directs the various charging operations automatically. The microprocessor continuously samples the voltage at the battery terminals, and the microprocessor follows a unique algorithm to quickly and efficiently charge most 12 volt automobile, motorcycle, tractor and deep-cycle batteries. The charger is also capable of detecting hazardous conditions which may exist and alerting the user by displaying an appropriate warning message and sounding a piezoelectric buzzer. Upon sensing that the battery has accepted all the charge of which it is safely and reasonably capable, the microprocessor will deactivate the charging current and the message will be displayed that the battery is "charged". Should the battery voltage once again fall below the charged level, the microprocessor will initiate the charging cycle. For convenience a battery test function is also included.

The switching power supply of the present invention results in a considerable weight savings and the charger is much more efficient than a 60 hertz transformer-based charger for energy savings. The present charger provides current mode control which enables the battery to be charged up to 50% faster than conventional 60 hertz charges. The capability of the battery to accept more charge is determined by monitoring the change in terminal voltage with respect of time, dv/dt. This important feature enables the charger to sense when the battery has reached the end of the safe charging period and then turn off, thus preventing overcharging and severe outgassing. In addition to the dv/dt sensing, maximum voltage trip points have been established which when surpassed will cause the unit to turn off. This additional back up provides added protection should the charger be connected to defective battery. A timed finishing charge at a reduced amperage allows time for the specific gravity to build to its peak value. The battery charger has a visual display which displays various error messages to the user including clips not connected, clips reversed, battery dead, battery ok, charging, and charged. In each case, the microprocessor will initiate the appropriate action and additionally instructions are displayed on the display module as to how to properly attach the battery charger clips to the battery. Should the microprocessor ever be damaged, the battery charger control circuit is designed with protection for reverse voltage, high voltage and/or current conditions and will turn off the unit. The charger will never be activated or remain activated unless the voltage sensed on the battery charger clips is determined to be safe. Then a four second delay is added before the charging current is activated.

A typical battery charging curve of terminal voltage plotted versus time has an initially rapidly rising battery voltage rising at a steady rate of dv/dt until a knee of the curve is reached whereupon the battery will no longer accept charge at the established rate. Continued charging at a high current will cause severe outgassing in most batteries. However, limited charging at a reduced rate of current will bring the specific battery up to a higher level without damaging the battery. The specific gravity is still relatively low when the charging knee is reached yet the specific gravity can rise to its substantially fully charged condition with a slower rate of charge established by a timed finishing charge. This limited charging at a reduced rate of current will bring the specific gravity up to a higher level without damaging the battery.

Conventional 60 hertz battery chargers will reduce the rate of charging current as the terminal voltage increases. Such chargers have no way of knowing if the battery has accepted all the charge of which it is capable. The charging continues until a threshold voltage is reached, often times causing the battery to severely outgas or on the other extreme, not fully charging the battery.

The battery charger of the present invention can sense when the battery has reached the knee in its charging curve. This is when the rate of change of voltage with respect to time is very small. Experimentally, this charge acceptance factor is reached when the dv/dt is approximately 0.1 volts per hour. By sampling the voltage at regular intervals and storing it in a RAM in the microprocessor, the knee is located with axially results. Once the knee is sensed, the charging current is reduced, for example to 1.5 amps, and the charging continues for a timed interval to safely bring the specific gravity up to its charged value. A similar routine at lower currents is employed for a small battery charging current.

Accordingly, the object of the invention is to provide a microprocessor controlled battery charger which takes into account the charge rate and the rate of change of voltage with time.

Another object of the invention is to provide a battery charger providing constant current charging in three decreasing rate steps.

Another object of the invention is to provide a battery charger with charging current in decreasing steps and a final charging rate for a predetermined timed interval.

Another object of the invention is to provide a microprocessor battery charger which is capable of charging the battery in the absence of instructions by the user.

Another object of the invention is to provide a microprocessor battery charger which detects the condition of reversed or unconnected battery charger clips.

Other objects and a fuller understanding of the invention may be had by referring to the following description and claims, taken in conjunction with the accompanying drawing.

DESCRIPTION OF THE PREFERRED EMBODIMENT

Figure 1:
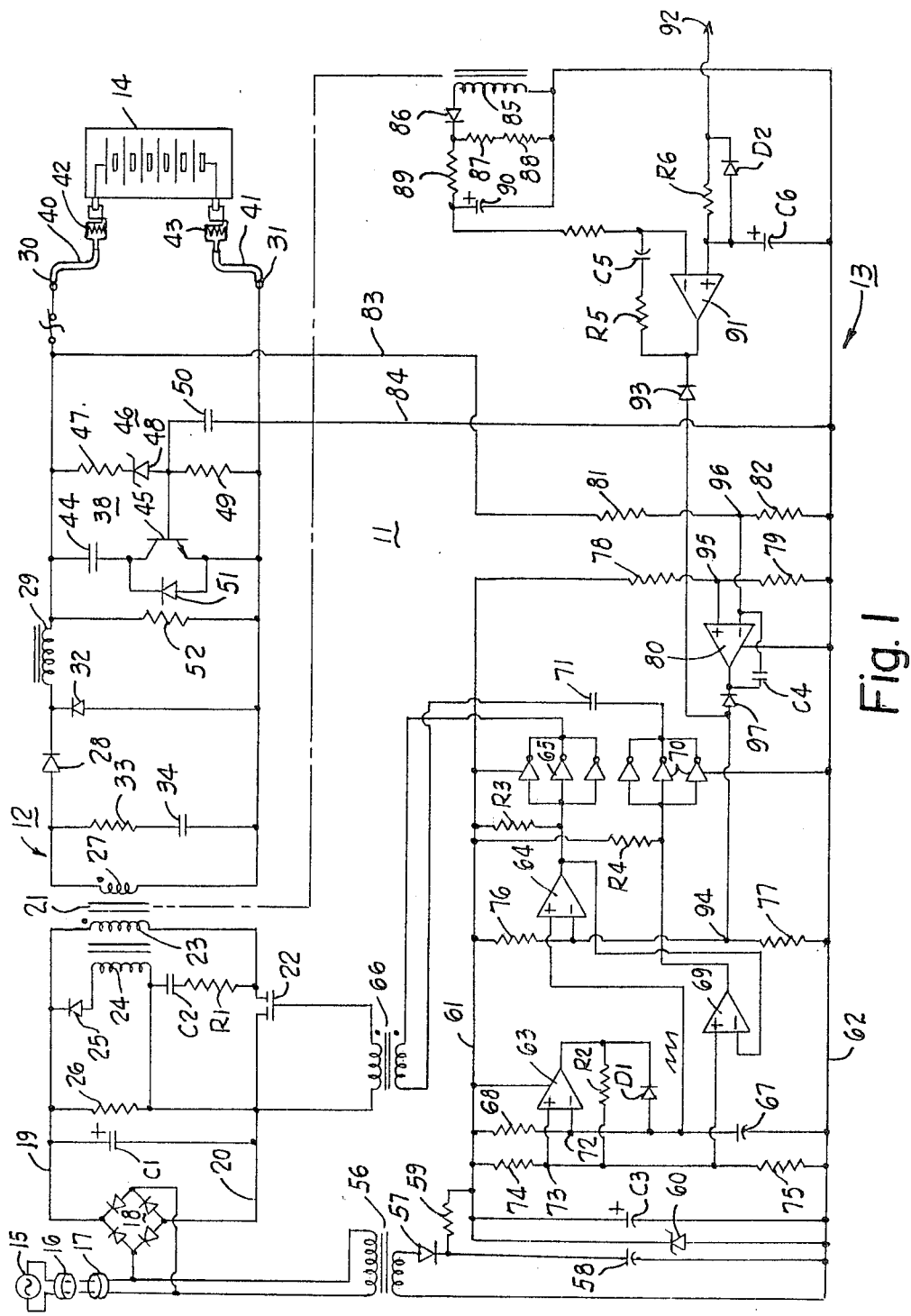
FIG. 1 is a schematic diagram of the battery charger and control circuit.

FIG. 1 shows a battery charger 11 having a power circuit 12 and a control circuit 13. The charger 11 is for charging a battery 14 such as a lead acid battery. An AC source 15 may be the conventional 120 volt 50 or 60 hertz power frequency source energizing an outlet 16. A plug 17 and cable assembly may be used to power the battery charger 11 and a rectifier bridge 18 supplies rectified power, positive on a conductor 19 relative to a conductor 20. This DC voltage is supplied to a step down transformer 21 through a power field effect transistor 22. The transformer 21 is part of a forward converter to convert the high voltage DC at conductors 19 and 20 into a lower voltage DC suitable for charging the battery 14. This forward converter operates at a high frequency, e.g. 20-50 KHz suppoed by the control circuit 13 to the transistor 22. This transistor 22 is caused to conduct at the high frequency rate and passes current through a primary winding 23 of the transformer 21. When the transistor 22 is not conducting, the transformer 21 resets by current flow through another primary winding 24, a diode 25 and a resistor 26 across the conductors 19 and 20. The transformer 21 does not have an air gap in the core, but is one with a hysteresis loop at about a thirty degree angle to the vertical. This transformer has a secondary winding 27 which is polarized so that the upper ends of windings 23 and 27 are simultaneously positive, and the secondary current is passed through a forward diode 28, through an inductive filter inductance 29 to a charger positive terminal 30. The charger has a negative terminal 31. When the transistor 22 is not conducting, the inductance 29 attempts to keep the current flowing and the inductive voltage thereof reverses to cause current flow in the same direction through the battery 14 and through a back diode 32. A small resistor 33 and a small capacitor 34 are connected across the secondary winding 27 to suppress voltage spikes on the diodes 28 and 32.

A spark suppression circuit 38 is connected permanently across the output terminals 30 and 31 of the battery charger. This charger has flexible cables 40 and 41, each with spring battery clips 42 and 43, respectively, to connect to the terminals of the battery 14. These flexible cables may be long, for example six or eight feet, for use in the homeowner's garage to connect to his automotive battery for charging. Because these cables are so long, they will have a considerable inductance and an inductance which is non determinative because the positioning of these cables will vary each time the homeowner uses the charger. The spark suppression circuit 38 is to suppress sparks which would otherwise be caused by the presence of a large filter capacitor 44 as the clips 42 and 43 are connected to the battery 14. If the large filter capacitor 44 were connected directly across the output terminals 30 and 31, it is well know that just as the connection to the battery was about to be made, a spark would be drawn between the battery terminal and the spring clip because the large capacitor would act essentially as a short circuit at that instant. To suppress this spark, the spark suppression circuit 38 is incorporated in the output of this battery charger. The spark suppression circuit includes a semi-conductor switch 45 shown as a transistor and specifically is a Darlington transistor. This semi-conductor switch is connected in series with the filter capacitor 44 across the output terminals. A bias circuit 46 is provided for the transistor 45 and is connected to the control electrode of the transistor and also to one of the main electrodes of the transistor, in this case the emitter electrode. The bias circuit inclues a resistor 47 and a zener diode 48 connected in series between the positive charger terminal 30 and the base of the transistor 44. A resistor 49 and a capacitor 50 are connected in parallel and connected between the base of the transistor 45 and the negative charger terminal 31. A diode 51 is connected in reverse across the main electrodes of transistor 45. A resistor 52 is connected across the charger output terminals.

The control circuit 13 is energized by the flexible cord and plug 17 from the AC source 15 and includes a step down transformer 56. A diode 57 and a capacitor 58 to establish a DC operating voltage. A resistor 59 and zener diode 60 are connected across this capacitor 58 to supply a regulated voltage on a conductor 61 relative to a common conductor 62. The control circuit 13 further includes an oscillator 63, in this case a saw-tooth voltage oscillator at about 45 KHz. The frequency of oscillation is governed by the rate of charging a capacitor 67 through a resistor 68 which are connected in series across the conductor 61 and 62. The saw-tooth voltage at a terminal 72 is applied to the non-inverting input of an amplifier 64, through parallel inverting amplifiers 65 and through an isolation transformer 66 to the transistor 22. The output of the driver amplifier 64 is connected to the inverting input of an amplifier 69, the output of which is applied through paralleled driver amplifiers 70 and through a coupling capacitor 71 to the other end of the primary of the isolation transformer 66. By this means, the circuit is completed for the isolation transformer primary and when the driver amplifiers 65 are on then amplifiers 70 are off, and vice versa. Resistors 74 and 75 form a voltage divider across the conductor 61 and 62 to supply a reference coltage at a terminal 73 to the non-inverting inputs of oscillator 63 and amplifier 69. Resistors 76 and 77 also form a voltage divider to provide a lower reference voltage at a terminal 94 to the inverting input of amplifier 64.

Resistors 78 and 79 form another voltage divider to apply a reference voltage at a terminal 95 to the non-inverting input of an amplifier 80 which acts as a comparator to assure that the maximum voltage of a battery is not too high. To accomplish this resistors 81 and 82 are connected across the charger terminals 30 and 31 by means of conductors 83 and 84 and apply a battery feedback voltage at a terminal 96 to the inverting input of the comparator 80.

A current control is provided as part of the control circuit. A current transformer 85 has a primary which is a single turn from the step down transformer 21 to develop a coltage proportional to the current supplied by the battery charger 11. This voltage is rectified by a diode 86 and filtered by resistors 87–89 and a capacitor 90 and this voltage is applied to the non-inverting input of a current control amplifier 91. The non-inverting input of this amplifier has an input from a current input terminal 92, with input from the circuit of FIG. 2.

The control circuit 13 operates to regulate the duty cycle of the transistor 22 so as to regulate the current supplied by the charger 11 to the battery 14. The saw-tooth voltage wave developed by the oscillator 63 might be some value, for example 4.5 volts maximum. The nominal level set by the voltage divider 76 might be some lower value for example 3.4 volts. Therefore this sets some clipping level of the saw-tooth wave supplied to the amplifier 64.

The control circuit 13 operates such that an increasing positive voltage on the current input terminal 92 increases the output current of the battery charger 11. Assume first that the voltage applied to the current input terminal 92 is a high value such that amplifier 91 is always at a high output. In such case the diode 93 does not conduct and the voltage divider terminal 94 is always at the highest value, in the above example 3.4 volts. This will clip the saw-tooth voltage wave at the maximum value so that the amplifier 64 is usually off, being on only about 25% of the time. The amplifiers 65 invert this so that they are on about 75% of the time and hence the transistor 22 is on about 75% of the time for a 75% duty cycle and hence the maximum output of the battery charger 11.

Assume now the opposite condition with zero voltage applied to the current input terminal 92. Any attempted current feedback via the secondary 85 establishes a low condition on the output of the current control amplifier 91, and its low condition is passed by the diode 93 so that the voltage divider terminal 94 is essentially at zero voltage; namely, the voltage of the conductor 62. This means that the saw-tooth voltage wave is clipped essentially at the zero voltage level so that the amplifier 64 is on substantially 100% of the time, the amplifiers 65 are off substantially 100% of the time, and the transistor 22 is off for a zero percent duty cycle and zero output of the battery charger 11. Now with some intermediate value of the voltage applied to the current input terminal 92, an intermediate value of current will be established by the battery charger 11. An increasing positive voltage on the current input terminal 92 increases the current output of the charger 11. Any current output of the battery charger causes a voltage to be developed in the transformer secondary 85 and since this is applied to the inverting input of the current control amplifier 91, this is a negative feedback for stability of the system.

The control circuit 13 provides a means to delay supplying a voltage from the output of the charger 11 at the terminals 30 and 31 until after these output terminals are connected to a battery 14 which is to be charged. The comparator 80 is connected as a voltage limit. The voltage divider resistors 78 and 79 establish a voltage at a terminal 94 which for example might be 4.5 volts. The voltage divider resistors 81 and 82 establish a voltage at a terminal 95 which for normal battery voltages will be less than the voltage at terminal 94. For example, for a battery voltage of 12.6, the voltage at terminal 95 might be about 3.2. Thus the comparator 80 will not become active to limit the voltage until the battery voltage reaches about 18 volts at which time the output of comparator 80 will go low and then current is passed through a diode 97 to make terminal 94 go low and hence establish zero output current of the charger 11.

Figure 2:
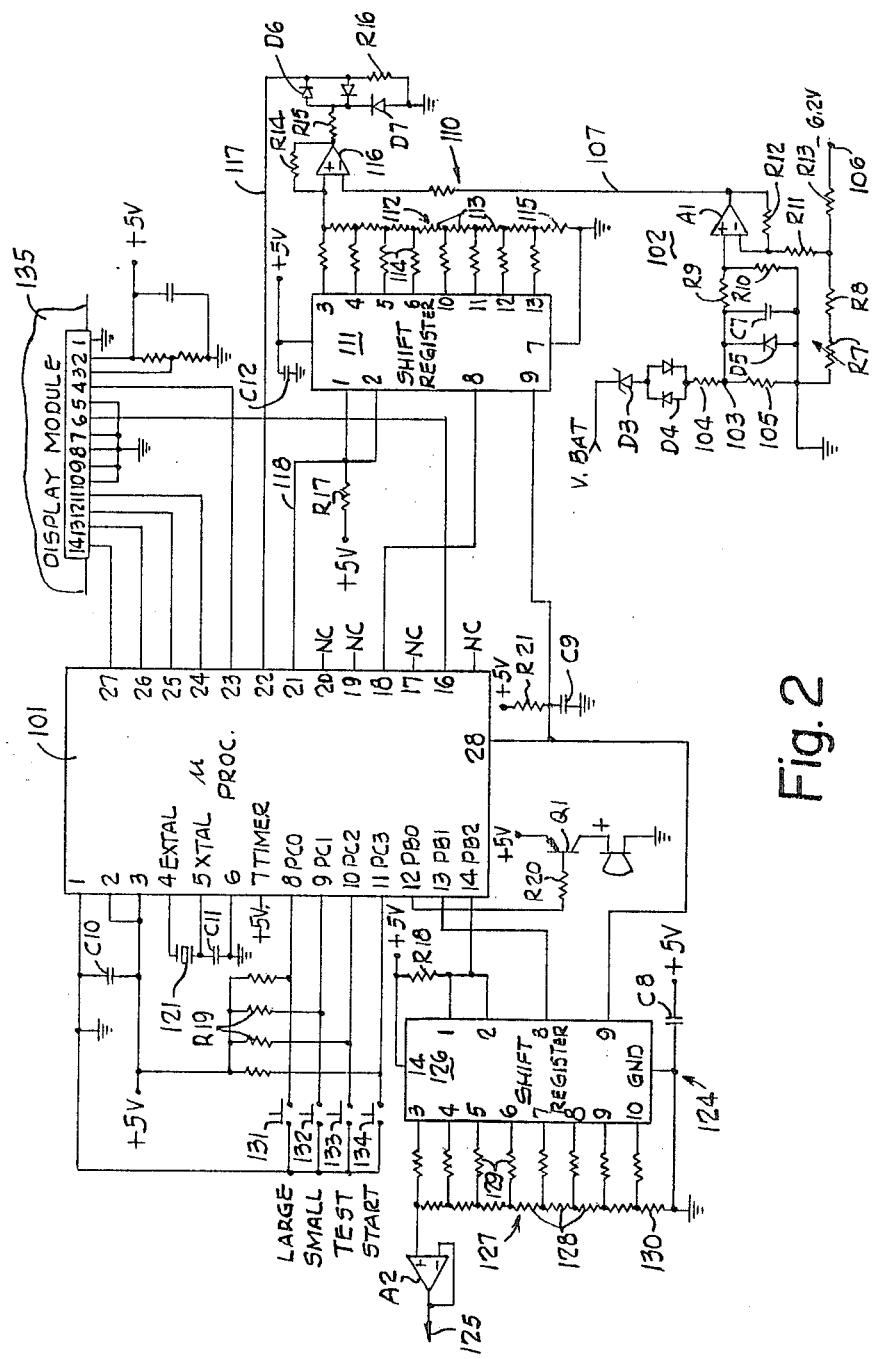
FIG. 2 is a schematic diagram of the microprocessor portion of the charger control circuit.

FIG. 2 illustrates the microprocessor portion of the control circuit for the battery charger 11 and shows a microprocessor 101 which controls the program for the battery charger. This battery charger may be used with a normal 12 volt six cell led acid battery used in automobiles, and that battery voltage might range between 12 and 16 volts during charging. As such, it is a voltage higher than that usually utilized in logic circuits which often is about five volts. Accordingly, the circuit of FIG. 2 includes a scaling circuit 102 which scales down the battery voltage about 3 to 1 by using the lower voltage at a terminal 103 between voltage divider resistors 104 and 105. A terminal 106 is connected to a negative operating voltage in order to be able to have the zero voltage point moved up slightly from the ground level so that the circuit is capable of sensing reversed connection of battery clips to the battery.

This scaled down battery voltage is applied on a conductor 107 to an analog-to-digital converter 110 which includes a shift register 111 and a R2R ladder network 112. This ladder network includes a string of series connected resistors 113 with each terminal between the resistors in that series string connected by one of paralleling resistors 114 to parallel output terminals of the shift register 111. A terminating resistor 115 is connected between the series resistors 113 and ground. The ladder network and the conductor 107 supply inputs to the non-inverting and inverting inputs, respectively, of a comparator 116 to develop an output on a conductor 117 returning to the microprocessor 101 a number between 0 and 255 indicating the value of the battery voltage. The shift register 111 has a serial eight bit input on a conductor 118 from the microprocessor and this is supplied as an eight bit parallel output from the shift register to the ladder network 112. This ladder network makes successive approximations, periodically, and with a 5.0 volt input the successive approximations are in equal steps of about 0.020 volts. This microprocessor may operate at a relatively high speed as controlled by a crystal 121. The crystal controlled frequency might be near one megahertz, for example, and the sampling by the microprocessor might be at a one kilohertz rate. The shift register can operate at about one megahertz rate so that the 256 bits on the ladder network will determine the battery voltage once each cycle of the subroutine. The successive approximations can rapidly switch from lower to higher voltages to rapidly approach and determine the actual battery voltage. Thus, the comparator will switch states as the ladder network puts out a voltage which just exceeds the input on the inverting input of comparator 116 which is the scaled battery voltage.

Next the microprocessor 101 goes through its charging algorithm and applies a voltage on a second converter 124 which is a D/A converter to establish a voltage on a terminal 125 which is connected to terminal 92 on FIG. 1 which establishes the proper current for the charger 11. The D/A converter 124 includes a shift register 126 and an R2R ladder network 127 essentially similar to that shown for the A/D converter 110. The ladder network 127 includes series connected resistors 128, parallel resistors 129 and a terminating resistor 130. This D/A converter 124 operates essentially the same as the A/D converter 110 and develops a voltage on terminal 125 to control the current of the charger 11 in accordance with the particular program chosen in the microprocessor. In the circuit of FIG. 2 four different programs may be chosen labelled large, small, test and start and selected by key pad switches 131-134, respectively. These refer to the charging of a large or a small battery; for example, a normal automotive battery or a motorcycle battery; a test procedure for a battery; and an engine start or boost condition with a large charging current from the charger 11. The microprocessor circuit of FIG. 2 also includes a display module 135 connected to the microprocessor 101 to display a number of messages.

Figure 3:
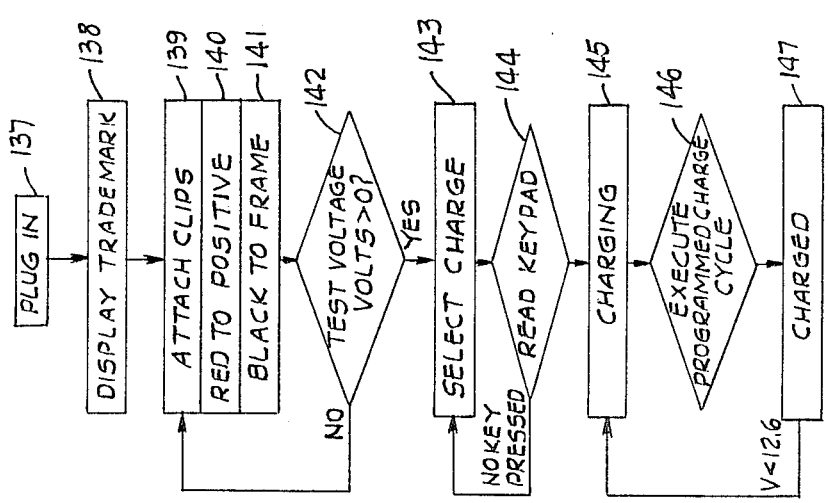
FIG. 3 is a diagram of the message which may be displayed on the display module of the battery charger.

FIG. 3 illustrates some of the many messages which may be displayed on the display module 135. In this FIG. 3, the block 137 indicates the plug in of the plug 17 to the electrical outlet 16 to initially energize the charger. Block 138 indicates that the display module will display the message which in this case is the particular trademark used on this battery charger 11. Next blocks 139, 140 and 141 show that what is displayed in sequence is "attach clips", "red to positive" and "black to frame". The decision block 142 asks the question whether the test voltage is greater than zero. If it is not, then the blocks 139, 140 and 141 are again displayed in sequence. If the decision is yes, then block 143 shows that what is displayed is "select charge". Next the decision block 144 shows that the key pads are read and if no key is pressed then the select charge message is again displayed. If a key is pressed then block 145 shows that the display module displays the message that the charger is "charging". During this charging, the decision block 146 shows that the charger is executing the programmed charge cycle described below. Upon the completion of this programmed charge cycle, block 147 shows that "charged" is displayed. Should the battery voltage fall below 12.6 volts then the program shows that the charging is reinitiated as shown in block 145.

Figure 4:
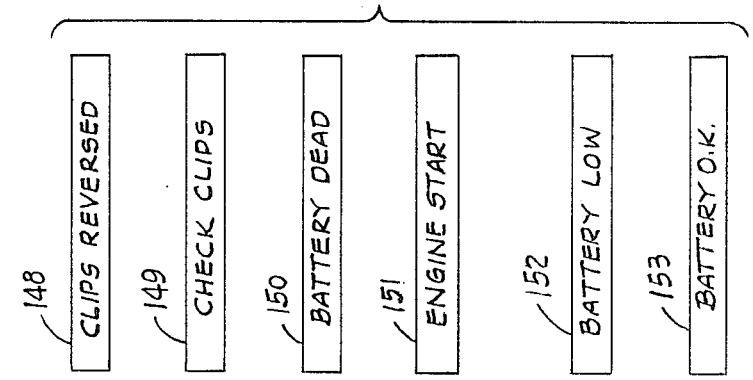
FIG. 4 is a diagram of additional messages which may be displayed on the display module.

FIG. 4 shows additional messages which may be displayed on the display module 135. Block 148 states "clips reversed" in the event that the user connects the battery clips in the wrong polarity to the battery. Block 149 shows that the message "check clips" may be displayed under certain low voltage conditions. Block 150 shows that "battery dead" may be displayed under other low voltage conditions. Block 151 shows that the message "engine start" may be displayed when the key pad switch 134 for engine start is actuated. When the key pad test switch 133 is actuated then block 152 might be displayed showing "battery low" or block 153 might be displayed showing "battery ok".

Figure 5:
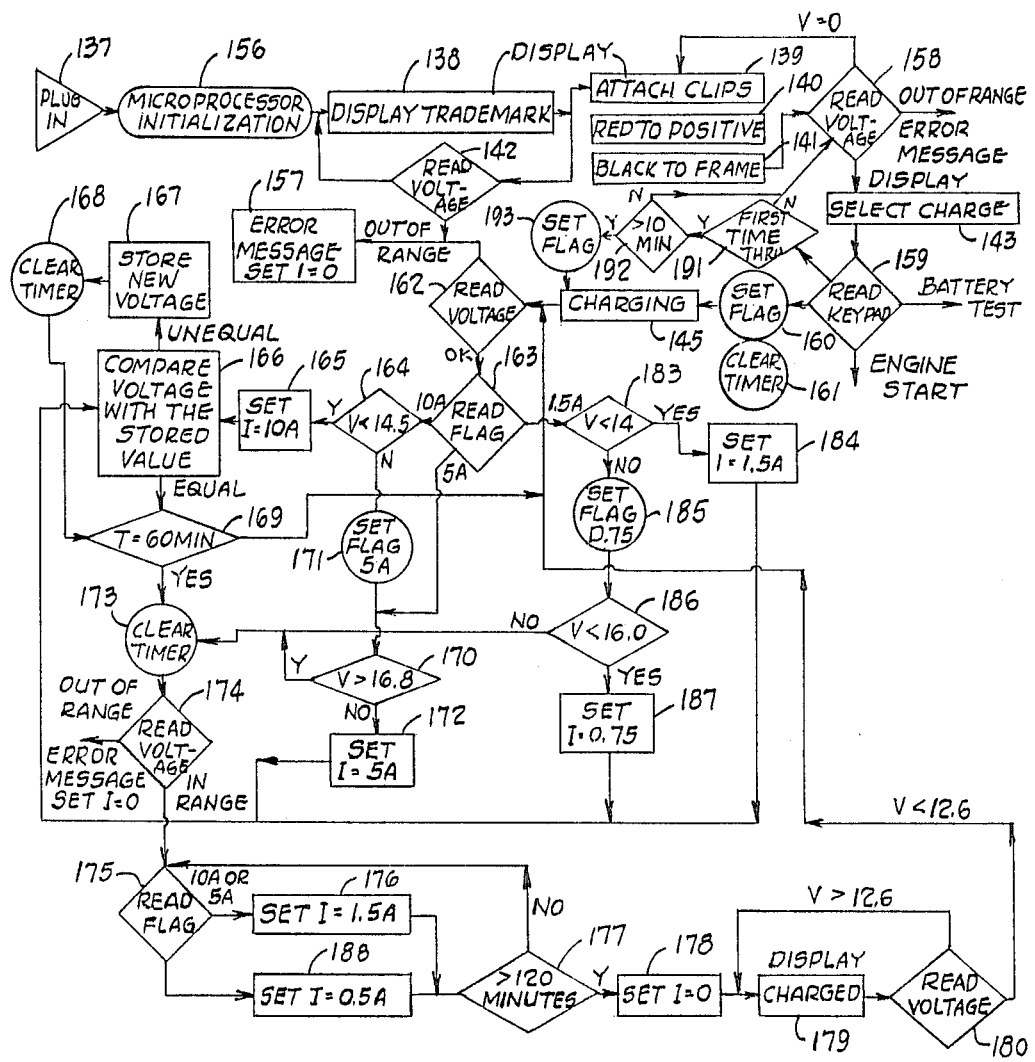
FIG. 5 is a flow chart of the program for the microprocessor.

The four different algorithms or programs in the microprocessor 101 of FIG. 2 are shown with more detail in the program or flow chart of FIG. 5. The block 137 shows that when the battery charger plug 17 is plugged into the electrical outlet 16, then the microprocessor circuit of FIG. 2 is initialized as shown by block 156 on FIG. 5. At this point block 138 shows that what is displayed is the trademark of the battery charger and this might be displayed for a certain length of time for example eight seconds. Next the display moves on to successive displays as shown in blocks 139, 140 and 141 perhaps four seconds each to show that the user should attach the clips with red to positive and black to the frame. If the user does not immediately comply then the block 142 shows that the voltage is read and if the voltage is not greater than zero, the program returns to block 138. If the voltage is read and it is out of range, then block 157 shows that an error message is displayed and the current is set to zero. The particular error message which is displayed may be any one of those shown in blocks 148, 149 and 150 on FIG. 4. The "clips reversed" is displayed if the voltage is less than zero. The "check clips" message is displayed if the voltage is less than 8 volts. The battery dead message is displayed if the voltage is between 8 and 10.7 volts because this would indicate a dead cell in the battery.

The program of FIG. 5 continues when a voltage is read other than zero and decision block 158 shows that the voltage is read after the messages of blocks 139, 140 and 141 are displayed. If the voltage is still zero then these three messages are again displayed. If the voltage is read but it is out of range, then error messages are displayed as set forth above. If the voltage is in range, then block 143 shows that the message to "select charge" is displayed. Next decision block 159 states that the key pad switches are read and if none of the key pad switches are actuated then the program returns to the decision block 158. If the battery test switch 133 is actuated, then the battery test program is initiated with a testing of the battery to determine if the battery is low or if the battery is ok as shown by the display blocks 152 and 153 on FIG. 4. If the engine start or boost key pad switch 134 is actuated, then the engine start program is initiated. This establishes a constant 20 ampere charging rate at about a voltage of eight volts. This condition for a period of ten minutes will warm the battery and also raise the specific gravity so that the battery will more readily start the automobile engine. If either the large or small battery switches 131 or 132, respectively, is actuated then the program is set for charging such a large or small battery. In either case, a charging program is set wherein the battery is charged by three progressively decreasing currents, each one a constant current. As an example, for a large battery which would be the normal automotive battery, the three selected constant current rates are 10, 5, and 1.5 amperes. For a small battery selected this would be for example a motorcycle battery, then the three selected constant current rates are 1.5, 0.75 and 0.5 amperes.

If the large battery switch 131 has been actuated, this sets the flag in block 160 which clears a timer 161 in the microprocessor 101, and sets the display to show charging. The program next reads the voltage as shown in block 162, and if the voltage is out of range, then an error message is displayed. These messages again could be clips reversed if the voltage is less than zero, check clips if the voltage is less than 8 volts of battery dead if the voltage is between 8 and 10.7 volts. If the voltage is within range, then block 163 shows that the flag is read. This flag is that set by the microprocessor for this large battery program and the decision block 163 asks whether the voltage is less than 14.5 and if the answer is yes then block 165 shows that the charging current is set at 10 amperes. This charging of the large battery at 10 amperes will immediately begin to raise the terminal voltage of the battery. This voltage is read in comparison block 166 and shows that it is compared with the stored value which for this initial condition will be zero. Since they are unequal, block 167 shows that the new voltage value is stored and block 168 shows that the timer is cleared. Decision block 169 shows that the question is asked whether the timer has timed out a period of 60 minutes and since it would not have at this beginning of the charging, the program proceeds back through blocks 162, 163, 164, 165 to 166 where the voltage is compared with the stored value. In this initial charging of the battery at the 10 ampere rate, the terminal voltage of the battery will be climbing rather rapidly.

For the first few machine cycles occurring about 4,000 times per second, there will be no change in the voltage so when the new battery voltage is compared in block 166 with the stored value, they will be equal and hence the program will go directly from block 166 to block 169 and then back through blocks 162–165. After a few minutes the high charging rate will increase the battery voltage enough so that the new value will be unequal to the stored value and hence the program will go through blocks 167 and 168 to block 169. Since only a few minutes has elapsed, the program will again loop through blocks 162–165.

Figure 6:
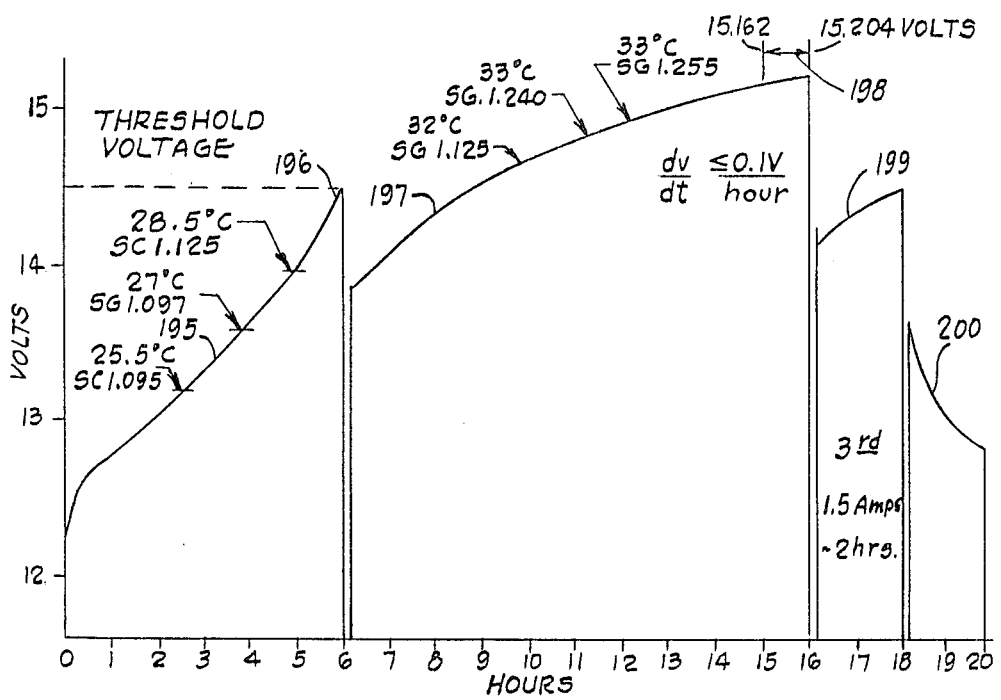
FIGS. 6 and 7 are graphs of volts versus time for the charging of two different batteries.

At some point in the charging at the high rate of 10 amps the battery voltage may not rise anymore and when the voltage is compared with the stored value in block 166, they will be found to be equal within the resolution of the entire system. In one battery charger constructed in accordance with this invention the resolution was about 1/10 of a volt. When they are found to be equal, then the program goes directly from block 166 to 169 and it will be assumed that the 60 minute timer has not yet timed out. Accordingly, the program will return to blocks 162 and 163 where the flag will be read which now controls the battery charger to establish a constant 5 ampere charging rate and the program will proceed to a question block 170. The program can also reach block 170 from block 164 if the voltage is greater than 14.5 in which case block 171 indicates that the flag should be set at 5 amperes. This is shown in FIG. 6, where the curve 195 has reached the 14.5 volt limit at a point 196. At block 170 the question is asked whether the voltage is greater than 16.8. Assuming the answer is no, then block 172 indicates that the current is set at 5 amperes. The program then loops through blocks 166, 167, 168, 169, 162, 163, 170 and 172 so long as the battery voltage as compared with the stored value is unequal. When the battery has charged a sufficient amount so that the battery voltage does not rise in one hour, within the resolution of the system, in this example 1/10 of a volt, then the program no longer proceeds through the aforementioned loop but instead goes from block 166 to block 169. This is shown in FIG. 6, where the 5 amp charging curve 197 has reached the dv/dt limit 198 of 0.1 volts per hour. The program then goes to block 173 which shows the timer is cleared and at block 174 the voltage is read. If for some reason, the voltage is out of range, then the appropriate error message is sent and the current is set to zero. If the voltage of the battery is in range, then block 175 shows that the flag is read and if a 10 or a 5 amp flag had been set then the program goes to block 176 which shows that the current is now set at 1.5 amperes for a finishing charge of the battery. This 1.5 ampere finishing charge will continue for a timed period of 120 minutes as shown by the decision block 177. This is shown in FIG. 6 as curve 199. At the end of this 120 minute period block 178 shows the current is set to zero and block 179 indicates that the display module displays the condition of charged. As long as the battery charger remains connected to the battery, then there is no charging of the battery but the voltage of the battery is periodically read by decision block 180, In this example about 4,000 times per second. This is shown in FIG. 6 as curve 200. Perhaps after a few days or a few weeks the battery voltage may drop below 12.6 volts in which case the program is restarted and loops up to decision block 162. The 5 amp flag would previously have been set so the program proceeds through blocks 170 and 172, 166, 167, 168, 169, 162 and 163. This 5 amp charging rate would be continued as set forth above until the rate of change of voltage with time was less about 1/10th of a volt per hour. At which time the current would be reduced to 1.5 amperes for a 2 hour finishing charge and then the battery display would read charged and the current would be set to zero. An alternative to the dv/dt termination of the second charge rate would be if the battery voltage exceeded 16.8 volts. This would be determined in decision block 170, and the program would then go through blocks 173, 174 and 175 to set the current at 1.5 amps.

The above description has been where the large battery switch 131 has been actuated. If the small battery switch 132 is actuated, this could be used for a smaller battery, for example a motorcycle battery or a lawn tractor battery. Where this small battery switch was actuated, then the program at block 163 would read the flag set for 1.5 amps and direct the program to decision block 183 where the question is asked whether the voltage is less than 14 volts. If the answer is yes then block 184 indicates that the current is set at 1.5 amps and the program goes to the comparison block 166. From here the program cycles in a manner similar to that described above in this case through blocks 167, 168, 169, 162, 163, 183, 184 and 166 until the voltage reaches 14 volts. At this point the program goes through decision block 185 where the flag is set 0.75 amperes. The decision block 186 next asks if the voltage is less than 16 volts. If the answer is yes, then block 187 shows that the current is set at 0.75 amps and the program proceeds to the comparison block 166 where the program loops as before. This looping of the program continues until the voltage of the battery remains equal with the stored value for one hour within the resolution of the system. At this time the program goes through blocks 173, 174 and 175 to the block 188 where the current is set at 0.5 amperes for the finishing charge for two hours and then the charger is turned off with the display that the battery is charged. Again the charger, if it remains connected to the battery, will periodically read the battery voltage and if and when it drops below 12.6 volts then the battery will be charged at the intermediate rate of 0.75 amperes until the rate of voltage change with time of the battery is less than the resolution of the system; namely, about 1/10 volt per hour and then the charger will be set at the finishing rate of 0.5 amperes for two hours and again the battery charger will be turned off.

The charger 11 also includes a program in the microprocessor in case the charger is connected to a battery but no key pad selection is made. In such event the system will still charge the battery. Block 158 on FIG. 5 shows that the voltage is read after the clips have properly been attached to the battery. The message is displayed that one should select charge as shown in block 143. Next the key pad is read as shown in block 159 and if none of the four switches 131-134 is actuated, then the program returns to the read voltage block 158 via a decision block 191 which asks if this is the first time through. If the answer is yes, the program proceeds to a decision block 192 which asks if ten minutes has expired. This gives a ten minutes delay for the user to select one of the key pad switches. If ten minutes has expired then block 193 shows that a flag is set for 1.5 amperes and the program proceeds to the charging block 145. The program then flows through blocks 162, 163, 183, 184, 166, 167, 168, 169 and rturn to block 162. In this way, the battery is charged at the rate 1.5 amperes. If it happens to be a small battery, the program may soon be switched over at block 183 to the second step of 0.75 amperes as shown at block 185 and then still later at block 175, the current is reduced for the third charging rate of 0.5 amperes for 120 minutes. If the battery happens to be a large battery, it may take many hours, for example 20 or 40 hours at this 1.5 amp rate to put enough charge in the battery so that the dV/dt for one hour is within the 0.1 volt resolution of this system to make the program flow from block 166 to 169 to 173, 174 and 175. At this point the program will flow to block 188 where the current will be set at 0.5 amperes for a finishing charge of the battery for 120 minutes. If this is not sufficient ampere-hours to fully charge a large battery, then the terminal voltage of the battery will decay within a short time to a point below 12.6 volts and therefore the charging cycle will be repeated until the battery is fully charged.

Figure 7:
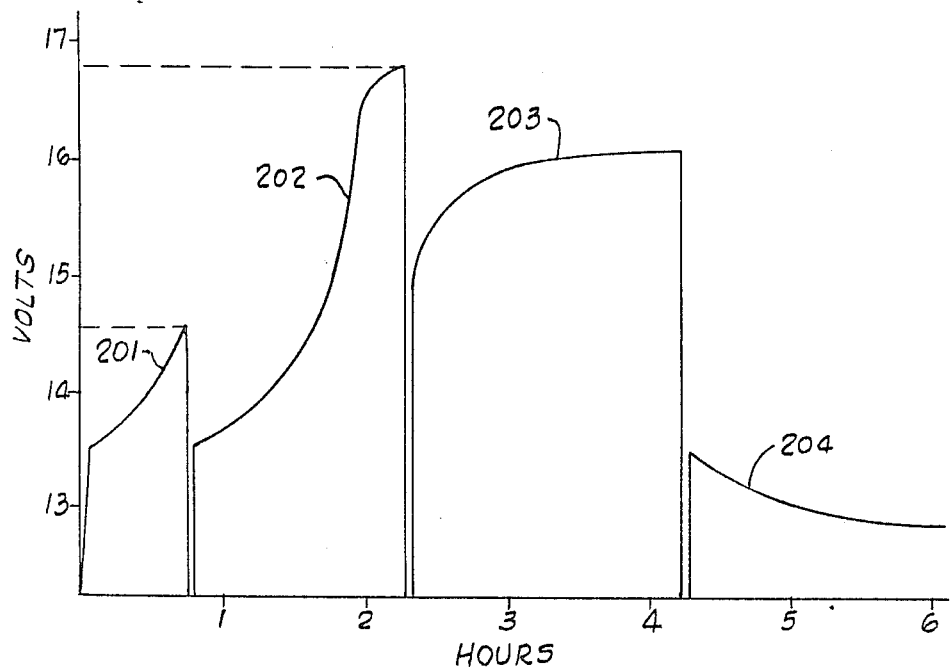

FIG. 7 shows the charging of another battery by this charger 11. The curve 203 shows that the 10 amp charging rate was terminated at the 14.5 volt limit, the curve 204 shows that the 5 amp charging rate was terminated at the 16.8 volt limit and the curve 205 shows the 1.5 amp charging rate was terminated after two hours. Curve 206 shows the decaying battery voltage after charging was terminated. In this case the battery was only partially discharged when charging was started.

The battery charger 11 has a number of valuable features. The decreasing step charging rate permits charging the battery at a near optimum condition with a high charging rate when the battery is discharged and yet decreasing to lower rates so that out-gassing of the battery is effectively minimized.

The battery charger 11 also has a further safety feature in that no voltage is developed at the output terminals 30 and 31 even though the battery charger is plugged into an electrical voltage source, until the battery charger is actually connected to a battery. This is accomplished by the circuit and program shown in FIGS. 2 and 5. FIG. 2 shows that the voltage of the battery is applied to the scaling circuit 102 and the output thereof is applied on conductor 107 to the comparator 116. If there is no battery voltage, then this zero voltage will be applied on conductor 117 to the microprocessor from the top of FIG. 5 one will note that the program proceeds through block 138 to block 142 where the voltage is read and if it is out of range then not only is an error message displayed but the current is set to zero. Accordingly, it will be noted that no output current can be supplied by the battery charger until a battery is actually connected to the charger. The battery charger is also shown to have first, second and third charging rates which establish first, second and third ampere hour amounts of charge of the battery, but none of these charge amounts is sufficient to fully charge the battery, instead it takes the combined ampere hours from each of these three charging rates to obtain a substantially fully charged battery.

The circuit of FIG. 1 includes the negative feedback of the actual charging current by means of the transformer secondary 85 and the current control amplifier 91. By this means, the battery current remains constant at the present rate, such as ten amperes in the above example. In the circuit of FIG. 2, the analog-to-digital converter 110 and especially the R2R ladder network therein is a means to achieve successive approximations so as to compare the battery voltage with a reference set in the microprocessor 101. This ladder network will achieve equal 20 millivolt steps of the five volts input so that the zero to 255 parallel bit output of the shift register 111 will achieve these successive approximations to be compared with the scaled battery voltage. If the scaling is exactly 3.6 to one then the five volts would be scaled up to read a maximum of 18 volts of battery voltage. Therefore, to achieve a battery voltage of 14.5 volts as a reference set by the program by block 164 of FIG. 5, then scaled down to 4.020 volts by the scaling network, this would coincide with serial bit input of 201 out of 256 serial bits on inputs 1 and 2 of the shift register 111. Accordingly, when the scaled down battery voltage caused the comparator 116 to change state at the count of 201, it will be known that the battery voltage of 14.5 volts has been reached.

It will be further realized from the above explanation that the battery charger has two different ways to change from the first to the second charging rate. The first way is when the rate of change of voltage with time is less than x/100 volts per hour where x is a positive number. In the example given, this about 1/10th volt per hour which is the resolution of a battery charger made in accordance with this invention. This occurs when the program goes from block 166 through 169 to 173 in FIG. 5. The second way to change from the first to the second charging rate is when the battery voltage exceeds a first predetermined value. In the example given, this is when the voltage exceeds 14.5 volts and in FIG. 5 this is when the program flows from block 164 through block 171 to block 170. It will further be noted that the battery charger includes a means to change from the second to the third charging rate upon the battery voltage exceeding a second predetermined value and this is when the voltage exceeds 16.8 volts and when the program flows from block 171 to 170 to 173 in the flow chart of FIG. 5.

In one practical circuit charging six-cell lead-acid batteries for automotive and motorcycle use, the following components were selected:

| Diodes | | | Transformer | |
|---|---|---|---|---|
| 18 | VJ648 | D1 | 1N4305 | 21 THF 86578 |
| 25, 51 | A115D | D2 | 1N4001 | 85 100:1 Current |
| 28, 32 | SGP 3040P | D3 | 5.6 v | Transformer |
| 48 | 6.8 v | D4 | 1N4002 | Inductance |
| 57 | 1N4001 | D5 | 1N4002 | 29 130 uh. |
| 60 | 9.1 v | D6, 7 | 1N4305 | Crystal |
| 86 | 1N4305 | | | 121 3.58 MHz |
| 93, 97 | 1N4305 | | | |
| Transistors | | | | |
| 22 | IRP740 | | | |
| 45 | D40K2X | | | |
| Q1 | 2N3906 | | | |
| Amplifiers | | | | |
| 63 | 339 | A1, A2 | LM248 | |
| 64 | 339 | | | |
| 65, 70 | CD4099 | | | |
| 69 | 339 | | | |
| 80 | 339 | | | |
| 91 | 348 | | | |
| 116 | LM248 | | | |
| Amplifiers | | | | |
| 101 | MCIC 68705P3 | | | |
| 111, 126 | 74HC164 | | | |
| 135 | M1641 | | | |
| Resistors | | | | |
| 26 | 33K | R1 | 10K | |
| 33 | 10 ohm | R2 | 2.2K | |
| 47, 49 | 1K | R3, R4 | 5.1K | |
| 52 | 220 ohms | R5 | 220K | |
| 59 | 200 ohms | R6 | 100K | |
| 68 | 22K | R7 | 200 ohms | |
| 74, 75 | 10K | R8 | 887 ohms | |
| 76 | 10K | R9, R10 | 20K | |
| 77 | 6.04K | R11, R12 | 20K | |

-continued

| | | | | |
|---|---|---|---|---|
| 78, 79 | 10K | R13 | 2.26K | |
| 81 | 30K | R14 | 5.1 Meg | |
| 82 | 10K | R15, 16 | 1K | |
| 87, 88 | 110 ohms | R17 | 1K | |
| 89 | 10K | R18 | 1K | |
| 104 | 2.55K | R19 | 5.1K | |
| 105 | 976 ohms | R20 | 2.2K | |
| 113 | 10K | R21 | 5.1K | |
| 114, 155 | 20K | | | |
| 128 | 10K | | | |
| 129, 130 | 20K | | | |
| Capacitors | | | | |
| C1 | 470 uf | 200 v | 34 | 1000 pf | 110 v |
| C2 | 50 pf | 1 Kv | 44 | 4700 uf | 35 v |
| C3 | 2.2 uf | 50 v | 50 | 4.7 uf | |
| C4 | .01 uf | | 58 | 41 uf | |
| C5 | .1 uf | | 67 | 2200 pf | |
| C6 | 4.7 uf | 50 v | 71 | .1 uf | |
| C7, 8 | .01 uf | | 90 | 4.7 uf | |
| C9 | 15 uf | | | | |
| C10 | .01 uf | | | | |
| C11 | 33 uf | | | | |
| C12 | .01 uf | | | | |

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be restored to without departing from the spirit and the scope of the invention as hereinafter claimed.

What is claimed is:

1. A microprocessor controlled battery charger adapted to be connected to a battery to be charged, said battery charger comprising, in combination:
    means to connect the battery charger to the battery to be charged;
    means to read the voltage of the battery;
    a timer;
    a microprocessor connectecd to said timer and to said voltage reading means for establishing a first charging rate for at least a short time period and for establishing a reduced second charging rate until the rate of change of voltage with time is less than x/100 volts per hour at which time the current is further reduced to a third charging rate for a finishing charge of the battery, where x is a positive number; and
    selector means to select the value of said first charging rate.

2. A battery charger as set forth in claim 1, wherein said voltage reading means is a comparison of the battery voltage with a reference value from said microprocessor.

3. A battery charger as set forth in claim 1, wherein said selector means is a selector switch.

4. A battery charger as set forth in claim 1, wherein said microprocessor controls said battery charger to charge the battery at said third charging rate in the absence of any charging rate selected or said selector means.

5. A battery charger as set forth in claim 1, wherein said first, second and third charging rates establish, respectively first, second and third ampere-hour amounts of charge of the battery, with none of said charge amounts being sufficient to substantially fully charge the battery.

6. A battery charger as set forth in claim 1, including means to hold each said charging rate constant despite changing battery voltage.

7. A battery charger as set forth in claim 1, wherein said voltage reading means includes successive approximation means compared with a reference in said microprocessor to determine the battery voltage.

8. A battery charger as set forth in claim 1, wherein said battery charger is a switching battery charger switching on and off at a rate in the order of ten to one hundred KHz; and said microprocessor controlling the duty cycle of the on periods to control the charging current rates.

9. A battery charger as set forth in claim 1, including current feedback means to maintain a constant charging current for each of said rates.

10. A battery charger as set forth in claim 1, including means to change from said first to said second charging rate upon the occurence of a rate of change of voltage with time being less than x/100 volts per hour.

11. A battery charger as set forth in claim 1, including means to change from said first to said second charging rate upon the battery voltage exceeding a first predetermined value.

12. A battery charger as set forth in claim 11, including means to change from said second to said third charging rate upon the battery voltage exceeding a second predetermined value.

13. A microprocessor controlled battery charger adapted to be connected to a battery to be charged, said battery charger comprising, in combination:

means to connect the battery charger to the battery to be charged;

means to read the voltage of the battery;

a timer; and a microprocessor connected to said timer and to said voltage reading means for establishing a first charging rate for at least a short time period and for establishing a second charging rate until the rate of change of voltage with time is less than x/100 volts per hour at which time the current is reduced to a third charging rate for a finishing charge of the battery, where x is a positive number;

said microprocessor establishing a zero current charge rate if said voltage reading means determines the battery voltage to be less than 10.7 volts for a six cell lead-acid battery.

14. A microprocessor controlled battery charger adapted to be connected to a battery to be charged, said battery charger comprising, in combination:

means to connect the battery charger to the battery to be charged;

means to read the voltage of the battery;

a timer; and a microprocessor connected to said timer and to said voltage reading means for establishing a first charging rate for at least a short time period and for establishing a second charging rate until the rate of change of voltage with time is less than x/100 volts per hour at which time the current is reduced to a third charging rate for a finishing charge of the battery, where x is a positive number;

said microprocessor establishing a zero current charge rate if said voltage reading means determines the battery to be connected in reverse polarity.

15. A microprocessor controlled battery charger adapted to be connected to a battery to be charged, said battery charger comprising, in combination:

means to connect the battery charger to the battery to be charged;

means to read the voltage of the battery;

a timer; and a microprocessor connected to said timer and to said voltage reading means for establishing a first charging rate for at least a short time period and for establishing a second charging rate until the rate of change of voltage with time is less than x/100 volts per hour at which time the current is reduced to a third charging rate for a finishing charge of the battery, where x is a positive number;

said microprocessor establishing a zero output voltage if said voltage reading means determines the battery is not connected to the charger.

* * * * *

UNITED STATES PATENT AND TRADEMARK OFFICE
CERTIFICATE OF CORRECTION

PATENT NO. :   4,710,694                         Page 1 of 2

DATED      :   December 1, 1987

INVENTOR(S) :  Richard C. Sutphin et al

It is certified that error appears in the above-identified patent and that said Letters Patent is hereby corrected as shown below:

```
Column 1, line 21, "U.S. Pat. No. 3,688,117"
      should be --U.S. Pat. No. 3,688,177--

Column 2, line 42, "charges"
      should be --chargers--

Column 4, line 1, "message"
      should be --messages--

Column 4, line 26, "supploed"
      should be --supplied--

Column 4, line 66, "know"
      should be --known--

Column 5, line 12, "inclues"
      should be --includes--

Column 5, line 46, "coltage"
      should be --voltage--

Column 5, line 63, "coltage"
      should be --voltage--

Column 7, line 3, "led"
      should be --lead--
```

UNITED STATES PATENT AND TRADEMARK OFFICE
CERTIFICATE OF CORRECTION

PATENT NO. : 4,710,694

DATED : December 1, 1987

INVENTOR(S) : Richard C. Sutphin et al

It is certified that error appears in the above-identified patent and that said Letters Patent is hereby corrected as shown below:

Column 9, line 44, "of"
   should be --or--

Column 10, line 60, "In"
   should be --in--

Column 14, line 31, "restored"
   should be --resorted--

Column 14, line 61, "or"
   should be --on--

Signed and Sealed this

Twelfth Day of July, 1988

*Attest:*

*Attesting Officer*

DONALD J. QUIGG

*Commissioner of Patents and Trademarks*